(12) United States Patent
Frederiksen et al.

(10) Patent No.: US 8,305,957 B2
(45) Date of Patent: Nov. 6, 2012

(54) APPARATUS, METHOD AND COMPUTER PROGRAM PRODUCT PROVIDING PER-UE SIGNALING TECHNIQUE FOR SEPARATELY CODED USERS

(75) Inventors: Frank Frederiksen, Klarup (DK); Olav Tirkkonen, Helsink (FI); Esa Malkamaki, Espoo (FI)

(73) Assignee: Nokia Corporation, Espoo (FI)

( * ) Notice: Subject to any disclaimer, the term of this patent is extended or adjusted under 35 U.S.C. 154(b) by 918 days.

(21) Appl. No.: 12/008,273

(22) Filed: Jan. 9, 2008

(65) Prior Publication Data
US 2008/0165730 A1 Jul. 10, 2008

Related U.S. Application Data

(60) Provisional application No. 60/879,676, filed on Jan. 9, 2007.

(51) Int. Cl.
*H04Q 7/00* (2006.01)
(52) U.S. Cl. .......................................... 370/328; 370/329
(58) Field of Classification Search .................... 370/328
See application file for complete search history.

(56) References Cited

U.S. PATENT DOCUMENTS

| | | | |
|---|---|---|---|
| 2005/0120097 A1* | 6/2005 | Walton et al. ................. | 709/220 |
| 2006/0280256 A1* | 12/2006 | Kwon et al. ................... | 375/260 |
| 2008/0059859 A1* | 3/2008 | Marinier et al. .............. | 714/748 |
| 2008/0298224 A1* | 12/2008 | Pi et al. .......................... | 370/204 |

FOREIGN PATENT DOCUMENTS
WO WO 03/010984 A1 2/2003

OTHER PUBLICATIONS

"Downlink L1/L2 Control Signaling", TSG-RAN WG1 #47, R1-063147, Nov. 2006, 8 pgs.
"Way Forward on Downlink L1/L2 Control Signaling", TSG-RAN WG1 #47, R1-063580, Nov. 2006, 1 pg.
3GPP TS 36.212 V.8.0.0, section 5.3.3.1 (Release 8), 2007, 4 pgs.
3GPP TS 25.212 V.7.6.0 (Release 7), 2007, 103 pgs.

* cited by examiner

*Primary Examiner* — Sulaiman Nooristany
(74) *Attorney, Agent, or Firm* — Harrington & Smith

(57) ABSTRACT

Apparatus, computer program products and methods operate an electronic device to determine an operating mode of a controlled electronic device operating in the wireless communications network; to generate a control signal in dependence on the operating mode of the controlled electronic device; to configure the control signal in a pre-determined manner in dependence on the operating mode of the controlled electronic device, wherein the pre-determined manner is known to both the electronic device and to the controlled electronic device; and to operate the radio apparatus to transmit the control signal to the controlled electronic device. In a variant, apparatus, computer program products and methods operate an electronic device to receive a control signal from a controlling electronic device operative in the wireless communications network, the control signal configured by the controlling electronic device in a predetermined manner known to both the controlling electronic device and the electronic device in dependence on an operating mode of the electronic device; and to decode the control signal using knowledge of the predetermined manner in which the control signal was configured by the controlling electronic device.

35 Claims, 7 Drawing Sheets

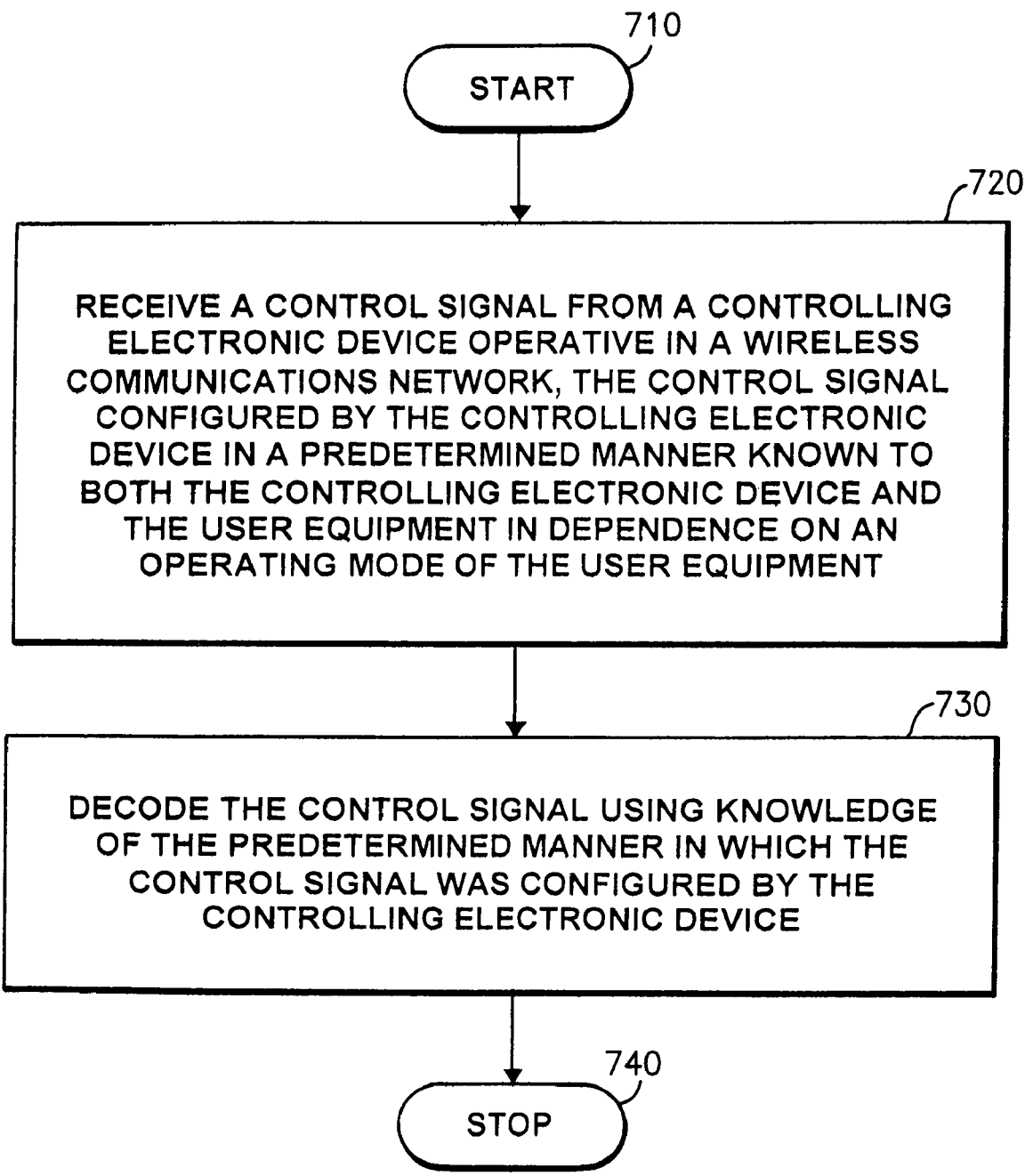

APPARATUS, METHOD AND COMPUTER PROGRAM PRODUCT PROVIDING PER-UE SIGNALING TECHNIQUE FOR SEPARATELY CODED USERS

CROSS-REFERENCE TO A RELATED PROVISIONAL PATENT APPLICATION

This application hereby claims priority under 35 U.S.C. §119(e) from provisional U.S. Patent Application No. 60/879,676 entitled "Apparatus, Method and Computer Program Product Providing Per-UE Signaling Technique For Separately Coded Users" filed on Jan. 9, 2007 by Frank Frederiksen, Olav Tirkkonen and Esa Malkamaki. The disclosure of provisional U.S. Patent Application Ser. No. 60/879,676 is hereby incorporated by reference in its entirety.

TECHNICAL FIELD

The exemplary and non-limiting embodiments of this invention relate generally to wireless communication systems, methods, devices and computer program products and, more specifically, relate to techniques to provide control channel signaling between user equipment and a wireless network node.

BACKGROUND

Various abbreviations found in the specification are defined as follows:

| | |
|---|---|
| 3GPP | third generation partnership project |
| LTE | long term evolution |
| OFDMA | orthogonal frequency division multiple access |
| UTRA | universal territory radio access |
| UE | user equipment |
| Node-B | base station |
| eNB | evolved Node-B |
| DL | downlink (Node B to UE) |
| UL | uplink (UE to Node B) |
| SC-FDMA | single carrier, frequency division multiple access |
| MIMO | multiple input, multiple output |
| SIMO | single input, multiple output |
| CRC | cyclic redundancy check |
| VoIP | voice over internet protocol |
| H-ARQ | hybrid automatic repeat request |

A proposed communication system known as evolved UTRAN (E-UTRAN, also referred to as UTRAN-LTE or as 3.9G/LTE) is currently under discussion within the 3GPP. The current working assumption is that the DL access technique will be OFDMA, and the UL technique will be SC-FDMA.

Currently, a control channel concept for separately coding the resource allocation signaling is under discussion. At a 3GPP RAN1 meeting (RAN1#47, Riga, Nov. 6-10, 2006) it was decided to use the following assumptions for the control channel for DL control signaling (see TSG-RAN WG1 #47, R1-063580, "Way Forward On Downlink L1/L2 Control Signaling"):

downlink control signaling is located in the first n OFDM symbols of a sub-frame;
n≦3;
data transmission in the downlink can, at the earliest, begin at the same OFDM symbol as the control signaling ends;
multiple control channels are used;
each control channel is convolutionally coded;
a UE monitors a number of control channels;
one control channel carries information for one MAC ID;
at least two formats (MCS) for control signaling is supported; and
the power setting of each control channel is determined by the Node-B.

Reference may also be had, for example, to TSG-RAN WG1 #47, R1-063147, "Downlink L1/L2 Control Signaling".

Of particular interest to the exemplary embodiments of this invention that are described below is the encoding structure of the control channel.

SUMMARY OF THE INVENTION

A first embodiment of the invention is an electronic device comprising: a radio apparatus configured to perform bidirectional communication operations in a wireless communications network; and a controller arranged to determine an operating mode of a controlled electronic device operating in the wireless communications network; to generate a control signal in dependence on the operating mode of the controlled electronic device; to configure the control signal in a pre-determined manner in dependence on the operating mode of the controlled electronic device, wherein the pre-determined manner is known to both the electronic device and to the controlled electronic device; and to operate the radio apparatus to transmit the control signal to the controlled electronic device.

A second embodiment of the invention is an electronic device comprising: a radio apparatus configured to perform bidirectional communication operations in a wireless communications network; and a controller arranged to operate the radio apparatus to receive a control signal from a controlling electronic device operative in the wireless communications network, the control signal configured by the controlling electronic device in a predetermined manner known to both the controlling electronic device and the electronic device in dependence on an operating mode of the electronic device; and to decode the control signal using knowledge of the predetermined manner in which the control signal was configured by the controlling electronic device.

A third embodiment of the invention is a computer program product comprising a computer readable memory medium tangibly embodying a computer program, the computer program configured to operate an electronic device in a wireless communications network, wherein when the computer program is executed, the electronic device is arranged to determine an operating mode of a controlled electronic device operating in the wireless communications network; to generate a control signal in dependence on the operating mode of the controlled electronic device; to configure the control signal in a pre-determined manner in dependence on the operating mode of the controlled electronic device, wherein the pre-determined manner is known to both the electronic device and to the controlled electronic device; and to operate a radio apparatus to transmit the control signal to the controlled electronic device.

A fourth embodiment of the invention is a computer program product comprising a computer readable memory medium tangibly embodying a computer program, the computer program configured to operate an electronic device in a wireless communications network, wherein when the computer program is executed, the electronic device is arranged to receive a control signal from a controlling electronic device operative in the wireless communications network, the control signal configured by the controlling electronic device in a predetermined manner known to both the controlling electronic device and the electronic device in dependence on an operating mode of the electronic device; and to decode the control signal using knowledge of the predetermined manner in which the control signal was configured by the controlling electronic device.

A fifth embodiment of the invention is a method performed by an electronic device operative in a wireless communications network, the method comprising: determining an operating mode of a controlled electronic device operating in the wireless communications network; generating a control signal in dependence on the operating mode of the controlled electronic device; configuring the control signal in a pre-determined manner in dependence on the operating mode of the controlled electronic device, wherein the pre-determined manner is known to both the electronic device and to the controlled electronic device; and operating a radio apparatus to transmit the control signal to the controlled electronic device.

A sixth embodiment of the invention is method performed by an electronic device operative in a wireless communications network, the method comprising: receiving a control signal from a controlling electronic device operative in the wireless communications network, the control signal configured by the controlling electronic device in a predetermined manner known to both the controlling electronic device and the electronic device in dependence on an operating mode of the electronic device; and decoding the control signal using knowledge of the predetermined manner in which the control signal was configured by the controlling electronic device.

BRIEF DESCRIPTION OF THE DRAWINGS

In the attached Drawing Figures:

FIG. 7 is flow chart depicting a UE method, and the execution of a computer program product embodying the method, in accordance with a further exemplary embodiment of this invention; and

DETAILED DESCRIPTION

Figure 1:
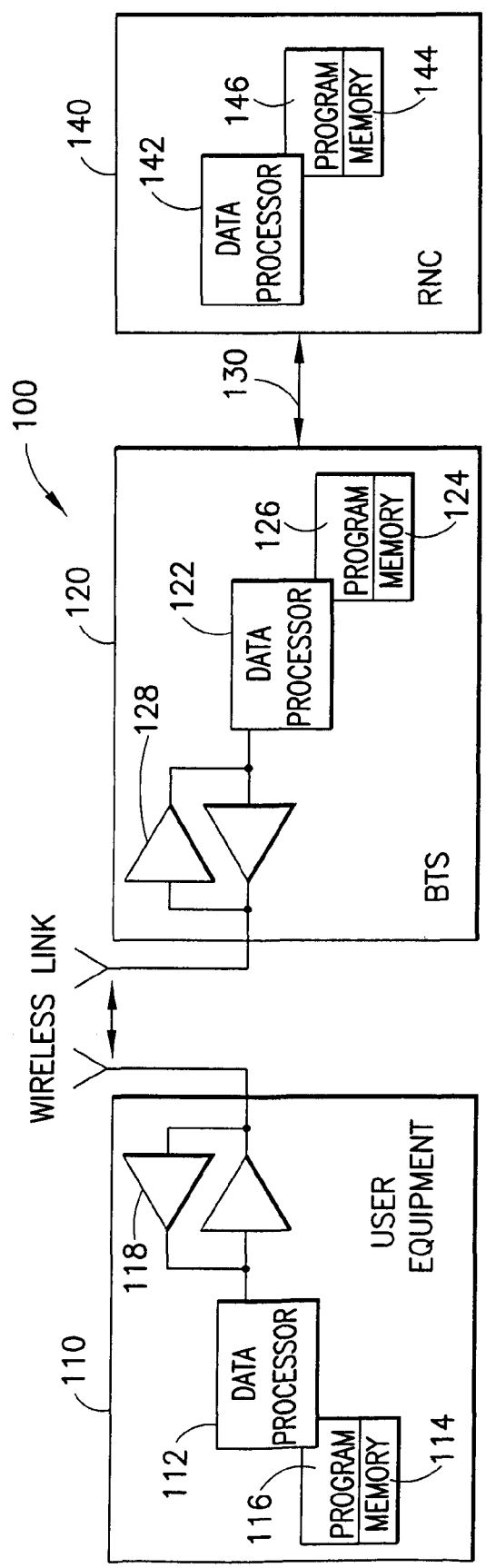
FIG. 1 shows a simplified block diagram of various electronic devices that are suitable for use in practicing the exemplary embodiments of this invention.

Reference is made first to FIG. 1 for illustrating a simplified block diagram of various electronic devices that are suitable for use in practicing the exemplary embodiments of this invention. In FIG. 1 a wireless network 100 is adapted for communication with a UE 110 via a Node B (base station) 120. The network 100 may include a network control element (NCE) 140. The UE 110 includes a data processor (DP) 112, a memory (MEM) 114 that stores a program (PROG) 116, and a suitable radio frequency (RF) transceiver 118 for bidirectional wireless communications with the Node B 120, which also includes a DP 122, a MEM 124 that stores a PROG 126, and a suitable RF transceiver 128. The Node B 120 is coupled via a data path 130 to the NCE 140 that also includes a DP 142 and a MEM 144 storing an associated PROG 146. At least one of the PROGs 116 and 126 is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 112 of the UE 110 and by the DP 122 of the Node B 120, or by hardware, or by a combination of software and hardware.

In general, the various embodiments of the UE 110 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 114, 124 and 144 may be of any type suitable to the local technical environment and may be implemented using any suitable data storage technology, such as semiconductor-based memory devices, magnetic memory devices and systems, optical memory devices and systems, fixed memory and removable memory. The DPs 112, 122 and 142 may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention relate to the encoding structure of the UTRAN-LTE control channel, and more specifically to the possibility of permitting different allocation sizes to be used for uplink or downlink allocations sharing the same physical resources.

Figure 2:
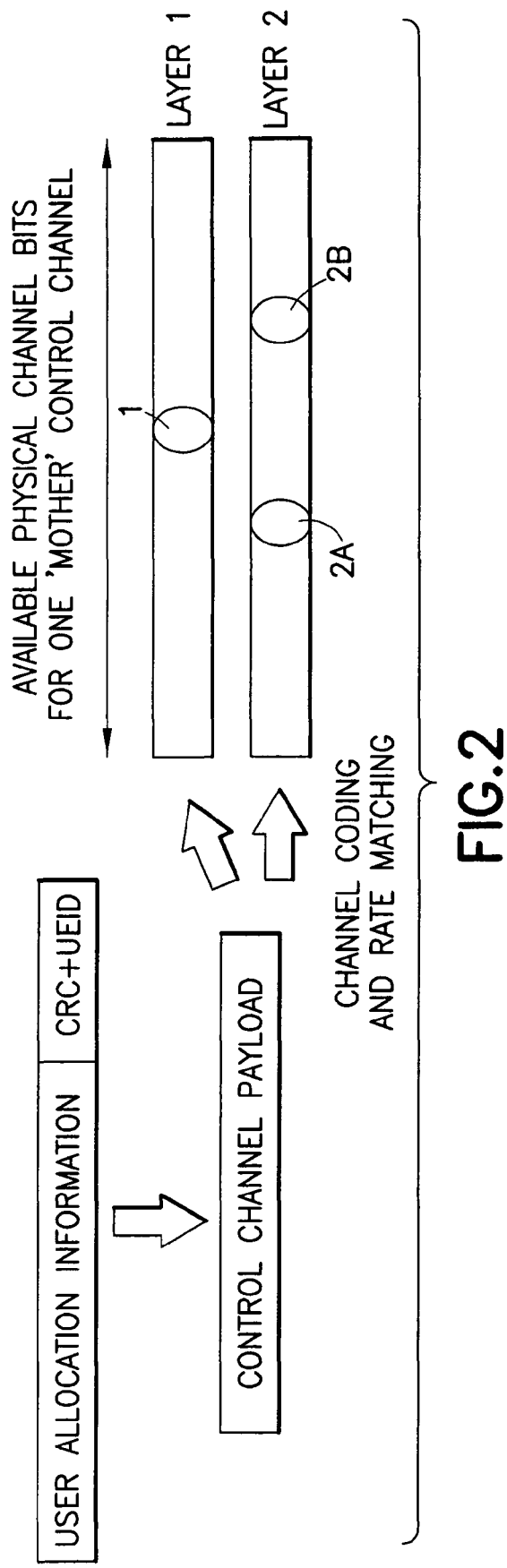
FIG. 2 illustrates coding flow of a control channel.

In previous discussion of the control channel structure it is assumed that there is a control channel payload which is signaled to a user that requires an UL or a DL allocation. A current concept is in principle depicted in FIG. 2, where the coding flow of a control channel is shown. More specifically, FIG. 2 illustrates a general principle of the coding structure where the user allocation for the UL or the DL has a UE identification (UEID) and a CRC attached. The payload of a control channel is then coded for forward error correction (FEC) and matched to the available physical channel capacity (channel coding and rate matching). Next, depending on the number of physical channel bits allocated for a control channel, the UE 10 is placed within a 'tree' constructed under a "mother" control channel segment (the tree in this case is indicated as daughter control channel segments 2a, 2b).

One of the issues when designing the control channel mapping is that the signaling fields in the resource allocation fields are prepared in such a way that there is provided a "one-size fits all" solution that provides the necessary information at all times, but for some cases bits may be reserved that are not used for certain UEs. However, it can be appreciated that this is inefficient from a signaling perspective, and this inefficiency is addressed by the use of the exemplary embodiments of this invention.

The exemplary embodiments of this invention provide for the allocation information content be dependent on a per-UE configuration, where the UE 110 may be in one of a number of modes which both the Node-B 120 and the UE 110 are aware of. As such, both the Node-B 120 and the UE 110 have a common understanding of how to encode, decode and interpret the control channel information. In particular, the exemplary embodiments of this invention address the reality that there may be a different number of control channel information bits that need to be transmitted to different UEs, depending on the per-UE configurations. However, those channel bits that the control information is transmitted on are divided into equal size parts or control channel segments. To solve this problem, a different code rate and/or a different rate matching principle is used for different per-UE configurations.

Issues to consider in this regard include, but need not be limited to:

1) the control channel is subdivided into parts or segments that have a uniform number of channel bits, independent of the UE 110 format;
2) both the Node-B 120 (base station) and the UE 110 have knowledge of the current UE 110 configuration; and
3) different coding/rate matching rates for different UE configurations are specified by the applicable standard.

Figure 3:
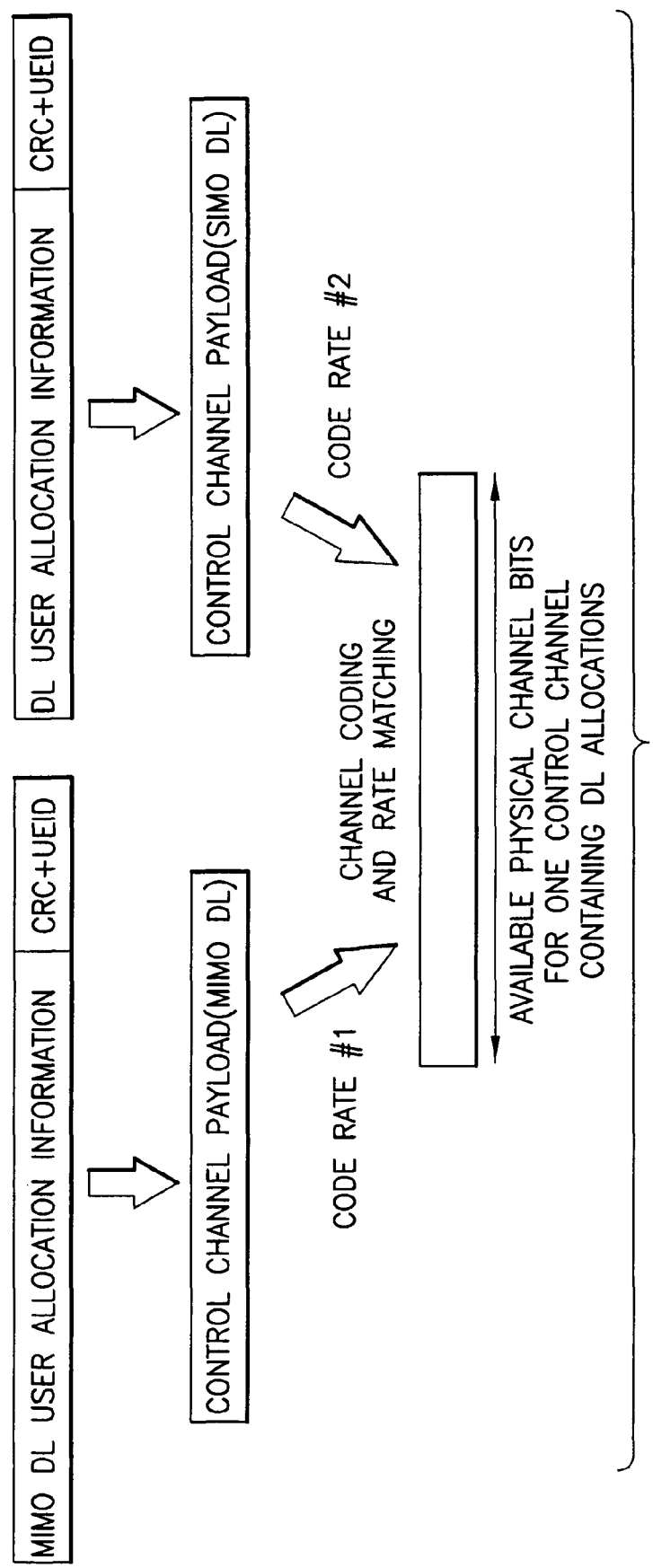
FIG. 3 illustrates a general principle of a signaling channel coding structure in accordance with exemplary embodiments of this invention.

To illustrate the operation of the exemplary embodiments of this invention, consider FIG. 3 which illustrates the general principle of the signaling channel coding structure. The illustrated structure is, in principle, applicable for both downlink and uplink allocations. The non-limiting example shown applies to a case where at least one UE 110 is signaled using additional MIMO-related control information, while one or more UEs 110 operating in the SIMO mode have another allocation payload. Note that the code rates of the two allocations are different, assuming that the number of available physical channel bits are the same for the downlink allocations.

That is, FIG. 3 illustrates two exemplary and non-limiting ways of introducing per-UE information (e.g., MIMO vs. SIMO, which may very well have different signaling requirements). The UE 110 operating in the MIMO mode has knowledge of this fact and decodes all DL allocation channels (assuming code rate #1) under the assumption that scheduled allocation information intended for the UE 110 was encoded by the Node-B 120 using MIMO-related information. In addition, a UE 110 operating in the SIMO mode also has knowledge of this fact and decodes all DL allocation channels (assuming a code rate #2) under the assumption that scheduled allocation information intended for the SIMO mode UE 110 was encoded by the Node-B 120 using SIMO-related information, i.e., the SIMO UE 110 decodes the same resources under the assumption that the allocations are carrying SIMO control-based information. In this way, it is possible to have a set of different per-UE code rates, which are known a priori by each UE 110 (and by the Node-B 120).

Note, however, that it is within the scope of the exemplary embodiments to reserve one or more control channels which have a fixed mapping rule (for example, SIMO), such that there is provided a fall back mode that is known by all UEs 110.

Other non-limiting examples of UE 110 modes, besides (single-user) MIMO and SIMO, can include VoIP vs. non-VoIP, special allocation formats for H-ARQ re-transmissions, special allocation formats for multi-user MIMO, and UEs 110 with localized vs. distributed allocation in the DL.

For those per-UE configurations where fewer control information bits need to be signaled the reliability of a control channel with a fixed transmission power is increased, and this fact may be taken into account when determining the transmission power used on control channel resources.

Note that the per-UE control channel rate control scheme can be applied to the uplink resource allocations as well.

The control channel flexibility that is provided by the use of the exemplary embodiments of this invention enables optimization of the control signaling in such a way that only required control signaling information need be transmitted to each UE 110, assuming that the Node-B 120 is enabled to isolate one or more per-UE defined features that require different amounts of control signaling.

Based on the foregoing it should be apparent that the exemplary embodiments of this invention provide a method, apparatus and computer program product(s) to provide allocation information content be dependent on a per-UE configuration or mode of operation, which both the Node-B 120 and the UE 110 are aware of, such that they both have a common understanding of how to encode, decode and interpret the control channel information. The exemplary embodiments of this invention enable different numbers of control information bits to be transmitted, depending on the mode of the UE 110, and transmit these control information bits using predefined equal numbers of control channel bits by the use of different code rates and/or different rate matching principles defined for different per-UE modes of operation.

Figure 4:
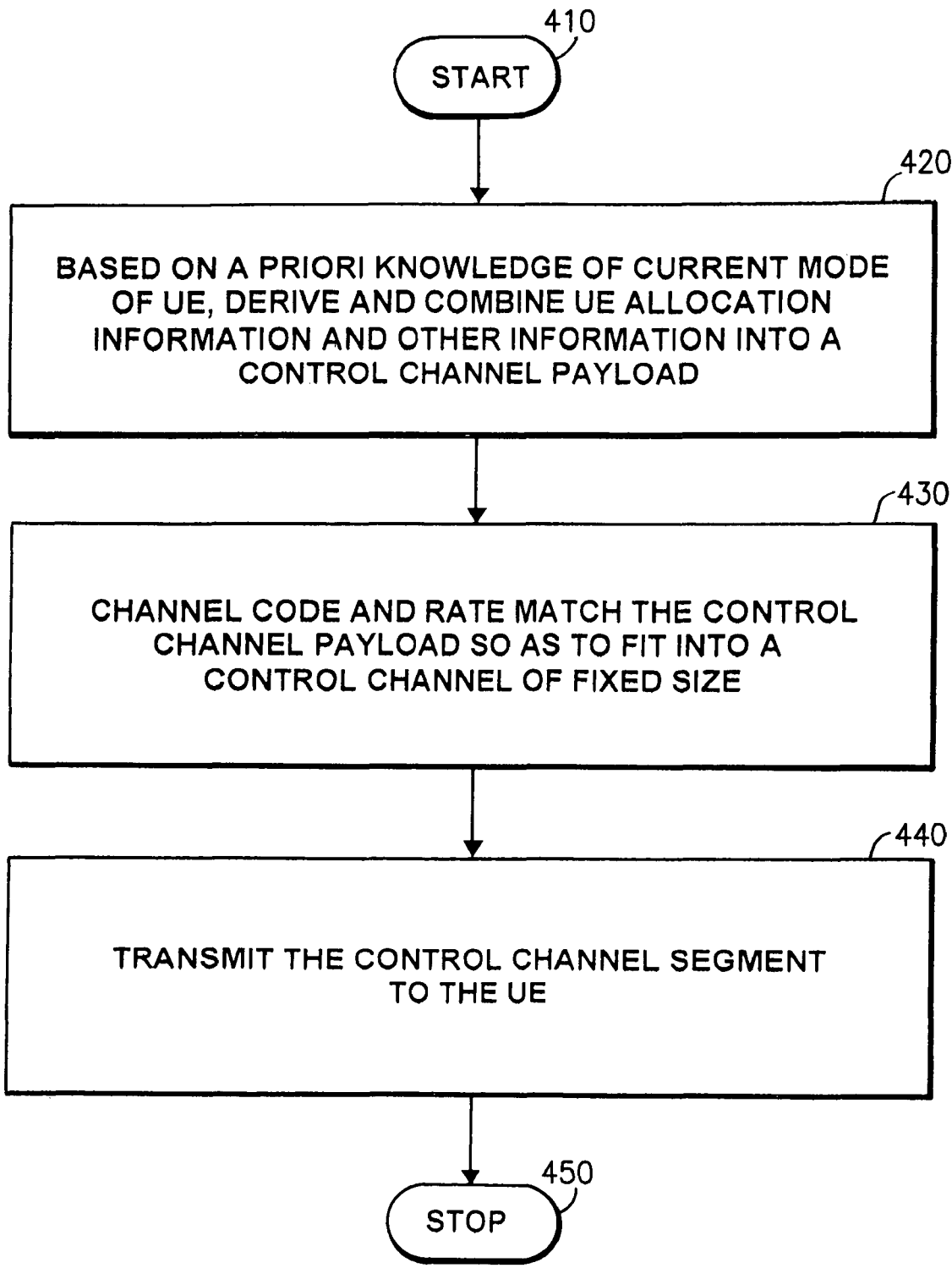
FIG. 4 is a flow chart depicting a Node-B method, and the execution of a computer program product embodying the method, in accordance with exemplary embodiments of this invention.

FIG. 4 is a flow chart depicting a method performed by an eNB 120 operating in accordance with the invention, and by a computer program product when executed by an eNB 120. The method starts at 410. Then, at 420, based on a priori knowledge of a current mode of a UE 10, the eNB 120 derives and combines UE 10 allocation information and other information into a control channel payload. Next, at 430, the eNB 120 channel codes and rate matches the control channel payload so as to fit into a control channel segment of fixed size. Then, at 440, the eNB 120 transmits the control channel segment to the UE 110.

Figure 5:
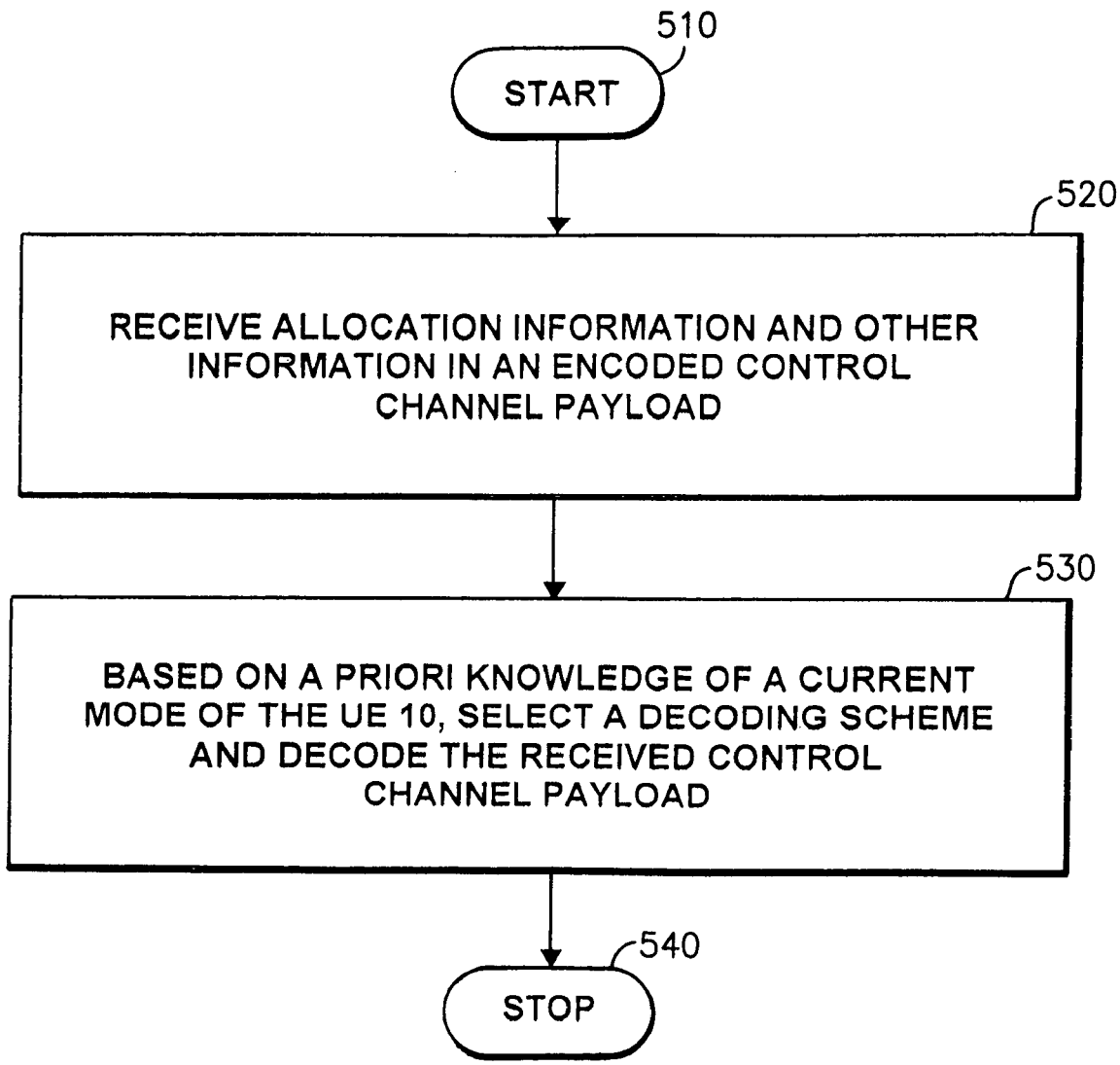
FIG. 5 is a flow chart depicting a UE method, and the execution of a computer program product embodying the method, in accordance with exemplary embodiments of this invention.

FIG. 5 is a flow chart depicting a method performed by UE 110, and by a computer program product when executed by a UE 110. The method starts at 510. Then, at 520, the UE 110 receives allocation information and other information in an encoded control channel payload. Next, at 530, based on a priori knowledge of a current mode of the UE 110, the UE 110 selects a decoding scheme and decodes the received control channel payload. The method stops at 540.

Note that the various blocks shown in FIGS. 4 and 5 may be viewed as method steps, and/or as operations that result from operation of computer program code, and/or as a plurality of coupled logic circuit elements constructed to carry out the associated function(s).

Figure 6:
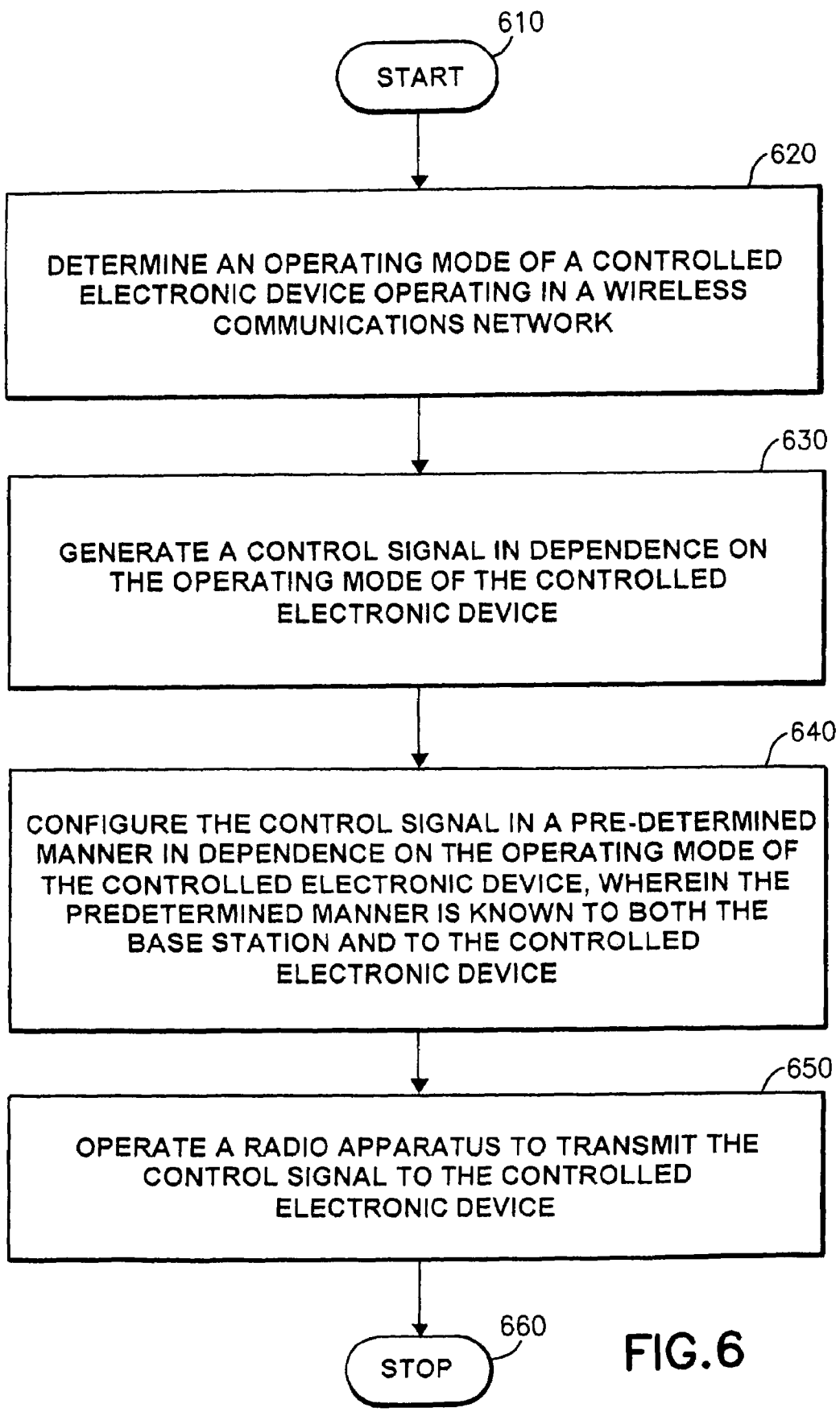
FIG. 6 is a flow chart depicting a Node-B method, and the execution of a computer program product embodying the method, in accordance with another exemplary embodiment of this invention.

FIGS. 6 and 7 are flow charts that summarize additional features of the invention. FIG. 6 depicts a method that is performed at a base station operative in a wireless communications network. The method depicted in FIG. 6 starts at 610. Then, at 620, a base station 120 like that depicted in FIG. 1 determines an operating mode of a controlled electronic device (such as, for example, user equipment 110 like that depicted in FIG. 1) operating in the wireless communications network. Next, at 630, the base station 120 generates a control signal in dependence on the operating mode of the controlled electronic device. Then, at 640, the base station configures the control signal in a pre-determined manner in dependence on the operating mode of the controlled electronic device, wherein the pre-determined manner is known to both the electronic device and to the controlled electronic device.

Next, at 650, the base station operates a radio apparatus to transmit the control signal to the controlled electronic device. The method stops at 660.

In a variant of the method depicted in FIG. 6, the wireless communications network is an E-UTRAN wireless communications network. In a typical implementation of the method depicted in FIG. 6, the predetermined manner concerns coding rate.

In another variant of the method depicted in FIG. 6, the base station 120 is further arranged to determine operating modes of a plurality of controlled electronic devices operating in the wireless communications system, where the operating modes further comprise at least first and second operating modes, the first and second operating modes differing from one another. In this variant the base station 120 is typically further arranged to generate a first control signal for a controlled electronic device operating in the first operating mode and a second control signal for a controlled electronic device operating in the second operating mode. As described previously with respect to operating modes that require differing control signal requirements, the base station is further arranged to configure the first control signal using a first coding rate and to configure the second control signal using a second coding rate, wherein the first and second coding rates differ from one another, and further wherein the first and second codes rates are selected in a predetermined manner known to both the electronic device and to the controlled electronic devices.

In a further variant of the method depicted in FIG. 6, the operating mode of the controlled electronic device comprises a MIMO operating mode and the control signal comprises MIMO-related control information. In yet another variant of the method depicted in FIG. 6, the operating mode of the controlled electronic device comprises a SIMO operating mode and the control signal comprises SIMO-related control information. In a still further variant of the method depicted in FIG. 6, the operating mode of the controlled electronic device comprises a VoIP operating mode and the control signal comprises VoIP-related control information. In another variant of the method depicted in FIG. 6, the operating a mode of the controlled electronic device comprises a H-ARQ re-transmission mode and the control signal comprises H-ARQ-related control information. In a further variant of the method depicted in FIG. 6, the operating mode of the controlled electronic device comprises a multi-user MIMO operating mode and the control signal further comprises multi-user-MIMO-related control information.

In yet another embodiment of the method depicted in FIG. 6, the control signal comprises at least channel allocation information. The channel allocation information may concern a downlink allocation or an uplink allocation.

FIG. 7 depicts a method in accordance with the invention that may be performed at user equipment 110 like that depicted in FIG. 1. The method starts at 710. Then, at 720, the user equipment 110 receives a control signal from a controlling electronic device (such as, for example, a base station 120 like that depicted in FIG. 1) operative in the wireless communications network, the control signal configured by the controlling electronic device in a predetermined manner known to both the controlling electronic device and the user equipment 110 in dependence on an operating mode of the user equipment 110. Next, at 730, the user equipment decodes the control signal using knowledge of the predetermined manner in which the control signal was configured by the controlling electronic device. The method stops at 740.

In a variant of the method depicted in FIG. 7 the wireless communications network is an E-UTRAN wireless communications network. The predetermined manner referred to in FIG. 7 typically concerns coding rate.

In a further variant of the method depicted in FIG. 7, the operating mode of the user equipment 110 comprises a MIMO operating mode and the control signal comprises MIMO-related control information. In yet another variant of the method depicted in FIG. 7, the operating mode of the user equipment 110 comprises a SIMO operating mode and the control signal comprises SIMO-related control information. In a still further variant of the method depicted in FIG. 7, the operating mode of the user equipment comprises a VoIP operating mode and the control signal comprises VoIP-related control information. In another variant of the method depicted in FIG. 7, the operating a mode of the user equipment 110 comprises a H-ARQ re-transmission mode and the control signal comprises H-ARQ-related control information. In a further variant of the method depicted in FIG. 7, the operating mode of the user equipment 110 comprises a multi-user MIMO operating mode and the control signal further comprises multi-user-MIMO-related control information.

In yet another embodiment of the method depicted in FIG. 7, the control signal comprises at least channel allocation information. The channel allocation information may concern a downlink allocation or an uplink allocation.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

What is claimed is:

1. An apparatus comprising:
   at least one processor; and
   memory storing computer program code;
   wherein the memory storing the computer program code is configured to, with the at least one processor, cause the apparatus to perform actions comprising at least:
   determining an operating mode of a plurality of controlled electronic devices operating in a wireless communications network, where the operating modes further comprise at least first and second operating modes, the first and second operating modes differing from one another;
   generating a first control signal for a controlled electronic device, operating in the first operating mode, based at least in part on the operating mode of the controlled electronic device;
   generating a second control signal for the controlled electronic device, operating in the second operating mode, based at least in part on the operating mode of the controlled electronic device;
   configuring at least one of the first and the second control signal in a pre-determined manner based at least in part on the operating mode of the controlled electronic device, wherein the pre-determined manner is known to both the apparatus and to the controlled electronic device; and transmitting the at least one of the first and the second control signal to the controlled electronic device, wherein the predetermined manner comprises transmitting control information bits using a predetermined number of control channel bits such that the number of control channel bits is independent of the operating mode of the controlled electronic device.

2. The apparatus of claim 1 wherein the wireless communications network is an E-UTRAN wireless communications network.

3. The apparatus of claim 1 wherein the predetermined manner concerns coding rate.

4. The apparatus of claim 1 where the actions further comprise configuring the first control signal using a first coding rate and configuring the second control signal using a second coding rate, wherein the first and second coding rates differ from one another, and further wherein the first and second codes rates are selected in a predetermined manner known to both the apparatus and to the controlled electronic device.

5. The apparatus of claim 1 wherein the apparatus further comprises a base station operative in the wireless communications network.

6. The apparatus of claim 1 wherein the controlled electronic device further comprises user equipment operative in the wireless communications network.

7. The apparatus of claim 1 where the operating mode of the controlled electronic device comprises a MIMO operating mode and wherein the control signal further comprises MIMO-related control information.

8. The apparatus of claim 1 where the operating mode of the controlled electronic device comprises a SIMO operating mode and wherein the control signal further comprises SIMO-related control information.

9. The apparatus of claim 1 where the operating mode of the controlled electronic device comprises a VoIP operating mode and wherein the control signal further comprises VoIP-related control information.

10. The apparatus of claim 1 where the operating mode of the controlled electronic device comprises a H-ARQ re-transmission mode and wherein the control signal further comprises H-ARQ-related control information.

11. The apparatus of claim 1 where the operating mode of the controlled electronic device comprises a multi-user MIMO operating mode and wherein the control signal further comprises multi-user-MIMO-related control information.

12. The apparatus of claim 1 wherein the control signal comprises at least channel allocation information.

13. The apparatus of claim 12 wherein the channel allocation information further comprises downlink channel allocation information.

14. The apparatus of claim 12 wherein the channel allocation information further comprises uplink channel allocation information.

15. The apparatus of claim 12 wherein the channel allocation information further comprises localized channel allocation information.

16. The apparatus of claim 12 wherein the channel allocation information further comprises distributed channel allocation information.

17. An apparatus comprising:
    at least one processor; and
    memory storing computer program code;
    wherein the memory storing the computer program code is configured to, with the at least one processor, cause the apparatus to perform actions comprising at least:
    receiving a control signal from a controlling electronic device operative in a wireless communications network, the control signal configured by the controlling electronic device in a predetermined manner known to both the controlling electronic device and the apparatus based at least in part on an operating mode of the apparatus; and
    decoding the control signal received from the controlling electronic device in the wireless communication network using knowledge of the predetermined manner in which the control signal was configured by the controlling electronic device, the knowledge of the predetermined manner comprising knowledge that the control signal was configured based at least in part on an operating mode of the apparatus and of a predetermined number of control channel bits used by the control signal to transmit control information bits, with the predetermined number of control channel bits being independent of the operating mode of the apparatus, wherein the operating mode is one of at least a first and a second operating mode, the first and second operating modes differing from one another, and wherein the knowledge of the predetermined manner in which the control signal was configured comprises knowledge that the control signal is a first control signal if the apparatus is operating in the first operating mode and a second control signal if the apparatus is operating in the second operating mode.

18. The apparatus of claim 17 wherein the wireless communications network is an E-UTRAN wireless communications network.

19. The apparatus of claim 17 wherein the knowledge of the predetermined manner comprises knowledge of coding rate.

20. The apparatus of claim 17 wherein the apparatus further comprises user equipment operative in the wireless communications network.

21. The apparatus of claim 17 wherein the controlling electronic device further comprises a base station operative in the wireless communications network.

22. The apparatus of claim 17 where the operating mode of the apparatus comprises a MIMO operating mode and wherein decoding the control signal takes into account knowledge that the control signal comprises MIMO-related control information.

23. The apparatus of claim 17 where the operating mode of the apparatus comprises a SIMO operating mode and wherein decoding the control signal takes into account knowledge that the control signal comprises SIMO-related control information.

24. The apparatus of claim 17 where the operating mode of the apparatus comprises a VoIP operating mode and wherein decoding the control signal takes into account knowledge that the control signal comprises VoIP-related control information.

25. The apparatus device of claim 17 where the operating mode of the apparatus comprises a H-ARQ re-transmission mode and wherein decoding the control signal takes into account knowledge that the control signal comprises H-ARQ-related control information.

26. The apparatus of claim 17 where the operating mode of the apparatus comprises a multi-user MIMO operating mode and wherein decoding the control signal takes into account knowledge that the control signal comprises multi-user-MIMO-related control information.

27. The apparatus of claim 17 wherein the control signal comprises at least channel allocation information.

28. The apparatus of claim 27 wherein the channel allocation information further comprises downlink channel allocation information.

29. The apparatus of claim 27 wherein the channel allocation information further comprises uplink channel allocation information.

30. The apparatus of claim 27 wherein the channel allocation information further comprises localized channel allocation information.

31. The apparatus of claim 27 wherein the channel allocation information further comprises distributed channel allocation information..

32. A non-transitory computer readable memory medium storing a program of instructions, execution of which configures an apparatus to perform actions comprising at least:
determining an operating mode of a plurality of controlled electronic devices operating in a wireless communications network, where the operating modes further comprise at least first and second operating modes, the first and second operating modes differing from one another;
generating a first control signal for a controlled electronic device, operating in the first operating mode, based at least in part on the operating mode of the controlled electronic device;
generating a second control signal for the controlled electronic device, operating in the second operating mode, based at least in part on the operating mode of the controlled electronic device;
configuring at least one of the first and the second control signal in a pre-determined manner based at least in part on the operating mode of the controlled electronic device, wherein the pre-determined manner is known to both the apparatus and to the controlled electronic device; and
transmitting at least one of the first and the second control signal to the controlled electronic device, wherein the predetermined manner comprises transmitting control information bits using a predetermined number of control channel bits such that the number of control channel bits is independent of the operating mode of the controlled electronic device.

33. A non-transitory computer readable memory medium storing a program of instructions, execution of which by a processor configures an apparatus to perform actions comprising at least:
receiving a control signal from a controlling electronic device operative in a wireless communications network, the control signal configured by the controlling electronic device in a predetermined manner known to both the controlling electronic device and the apparatus based at least in part on an operating mode of the apparatus; and
decoding the control signal using knowledge of the predetermined manner in which the control signal was configured by the controlling electronic device, the knowledge of the predetermined manner comprising knowledge that the control signal was configured based at least in part on an operating mode of the apparatus, and of a predetermined number of control channel bits used by the control signal to transmit control information bits, with the predetermined number of control channel bits being independent of the operating mode of the apparatus wherein the operating mode is one of at least a first and a second operating mode, the first and second operating modes differing from one another, and wherein the knowledge of the predetermined manner in which the control signal was configured comprises knowledge that the control signal is a first control signal if the apparatus is operating in the first operating mode and a second control signal if the apparatus is operating in the second operating mode.

34. A method comprising:
determining an operating mode of a plurality of controlled electronic devices operating in a wireless communications network, where the operating modes further comprise at least first and second operating modes, the first and second operating modes differing from one another;
generating a first control signal for a controlled electronic device, operating in the first operating mode, based at least in part on the operating mode of the controlled electronic device;
generating a second control signal for the controlled electronic device, operating in the second operating mode, based at least in part on the operating mode of the controlled electronic device;
configuring at least one of the first and the second control signal in a pre- determined manner based at least in part on the operating mode of the controlled electronic device, wherein the pre-determined manner is known to both the apparatus and to the controlled electronic device, the predetermined manner comprising configuring control information bits using a predetermined number of control channel bits such that the number of control channel bits is independent of the operating mode of the controlled electronic device; and
operating a radio apparatus to transmit the control signal to the controlled electronic device.

35. A method comprising:
receiving a control signal from a controlling electronic device operative in a wireless communications network, the control signal configured by the controlling electronic device in a predetermined manner known to both the controlling electronic device and the apparatus based at least in part on an operating mode of the apparatus; and decoding the control signal using knowledge of the predetermined manner in which the control signal was configured by the controlling electronic device, the knowledge of the predetermined manner comprising knowledge that the control signal was configured based at least in part on an operating mode of a controlled electronic device, and of a predetermined number of control channel bits used by the control signal to transmit control information bits, with the predetermined number of control channel bits being independent of the operating mode of the controlled electronic device, wherein the operating mode is one of at least a first and a second operating mode, the first and second operating modes differing from one another, and wherein the knowledge of the predetermined manner in which the control signal was configured comprises knowledge that the control signal is a first control signal if the apparatus is operating in the first operating mode and a second control signal if the apparatus is operating in the second operating mode.

* * * * *